US011030464B2

(12) United States Patent
Ito

(10) Patent No.: US 11,030,464 B2
(45) Date of Patent: Jun. 8, 2021

(54) PRIVACY PROCESSING BASED ON PERSON REGION DEPTH

(71) Applicant: NEC Corporation, Tokyo (JP)

(72) Inventor: Yuki Ito, Tokyo (JP)

(73) Assignee: NEC CORPORATION, Tokyo (JP)

(*) Notice: Subject to any disclaimer, the term of this patent is extended or adjusted under 35 U.S.C. 154(b) by 101 days.

(21) Appl. No.: 16/285,534

(22) Filed: Feb. 26, 2019

(65) Prior Publication Data
US 2019/0188490 A1 Jun. 20, 2019

Related U.S. Application Data

(63) Continuation of application No. 16/082,360, filed as application No. PCT/JP2017/009884 on Mar. 13, 2017.

(30) Foreign Application Priority Data

Mar. 23, 2016 (JP) .................. 2016-058401

(51) Int. Cl.
G06K 9/00 (2006.01)
G06K 9/62 (2006.01)
(Continued)

(52) U.S. Cl.
CPC ..... *G06K 9/00778* (2013.01); *G06K 9/00335* (2013.01); *G06K 9/00369* (2013.01);
(Continued)

(58) Field of Classification Search
None
See application file for complete search history.

(56) References Cited

U.S. PATENT DOCUMENTS 6,959,099 B2 * 10/2005 Gutta .................. G06T 5/002
382/100
7,756,299 B2 * 7/2010 Higaki .................. G06T 7/11
382/106
(Continued)

FOREIGN PATENT DOCUMENTS

CN 1705371 A 12/2005
CN 102037490 A 4/2011
(Continued)

OTHER PUBLICATIONS

Extended European Search Report for EP Application No. EP17769999.8 dated Sep. 30, 2019.
(Continued)

*Primary Examiner* — Randolph I Chu

(57) ABSTRACT

Provided are an image processing device and the like which implement personal privacy protection while suppressing a reduction in visibility for an image. The image processing device is provided with: a memory storing instructions; and one or more processors configured to execute the instructions to: detect a person region that is a region where a person appears in an image captured by a camera device; and perform, on the person region, privacy processing a strength of which differs according to a depth associated with coordinates of the person region or a predetermined index related to the depth.

9 Claims, 10 Drawing Sheets

(51) Int. Cl.
- *G06T 1/00* (2006.01)
- *G08B 25/00* (2006.01)
- *H04N 7/18* (2006.01)
- *G06T 7/536* (2017.01)
- *G06N 20/00* (2019.01)

(52) U.S. Cl.
CPC ......... *G06K 9/00771* (2013.01); *G06N 20/00* (2019.01); *G06T 1/00* (2013.01); *G06T 7/536* (2017.01); *G08B 25/00* (2013.01); *H04N 7/18* (2013.01); *G06K 2009/6213* (2013.01)

(56) References Cited

U.S. PATENT DOCUMENTS

| | | | | |
|---|---|---|---|---|
| 8,098,904 | B2 * | 1/2012 | Ioffe | G06K 9/00281 |
| | | | | 382/118 |
| 8,571,354 | B2 * | 10/2013 | Miksa | G06T 5/20 |
| | | | | 382/299 |
| 9,875,431 | B2 * | 1/2018 | Ikeda | G06N 20/00 |
| 2005/0270372 | A1 | 12/2005 | Henninger | |
| 2006/0195199 | A1 | 8/2006 | Iwasaki et al. | |
| 2008/0008355 | A1 * | 1/2008 | Okamoto | G06K 9/00369 |
| | | | | 382/104 |
| 2009/0059023 | A1 | 3/2009 | Sasaki | |
| 2009/0222388 | A1 | 9/2009 | Hua et al. | |
| 2009/0262987 | A1 | 10/2009 | Ioffe et al. | |
| 2010/0157127 | A1 * | 6/2010 | Takayanagi | H04N 5/23293 |
| | | | | 348/333.02 |
| 2010/0188519 | A1 | 7/2010 | Yamaoka et al. | |
| 2010/0290668 | A1 * | 11/2010 | Friedman | G06K 9/00255 |
| | | | | 382/103 |
| 2010/0322516 | A1 | 12/2010 | Xu et al. | |
| 2011/0050939 | A1 * | 3/2011 | Tsurumi | H04N 5/232 |
| | | | | 348/222.1 |
| 2011/0123068 | A1 | 5/2011 | Miksa et al. | |
| 2011/0199502 | A1 * | 8/2011 | Okamura | H04N 5/23212 |
| | | | | 348/222.1 |
| 2012/0151601 | A1 | 6/2012 | Inami et al. | |
| 2012/0188437 | A1 * | 7/2012 | Okamoto | H04N 5/232127 |
| | | | | 348/349 |
| 2012/0320230 | A1 | 12/2012 | Uehara | |
| 2013/0004082 | A1 * | 1/2013 | Kano | G06T 5/002 |
| | | | | 382/195 |
| 2013/0044226 | A1 | 2/2013 | Uehara | |
| 2013/0076944 | A1 | 3/2013 | Kosaka | |
| 2013/0147843 | A1 | 6/2013 | Shimizu | |
| 2013/0163813 | A1 * | 6/2013 | Shoji | G06T 11/60 |
| | | | | 382/103 |
| 2013/0329068 | A1 | 12/2013 | Hamanaka et al. | |
| 2014/0002616 | A1 * | 1/2014 | Ohba | G06T 7/70 |
| | | | | 348/47 |
| 2014/0003662 | A1 * | 1/2014 | Wang | H04N 19/85 |
| | | | | 382/103 |
| 2014/0186026 | A1 | 7/2014 | Oshima et al. | |
| 2014/0211045 | A1 * | 7/2014 | Tanaka | G06K 9/00268 |
| | | | | 348/239 |
| 2014/0226041 | A1 * | 8/2014 | Eguchi | H04N 5/23212 |
| | | | | 348/239 |
| 2014/0328512 | A1 * | 11/2014 | Gurwicz | G06K 9/6263 |
| | | | | 382/103 |
| 2014/0357369 | A1 * | 12/2014 | Callens | A63F 13/213 |
| | | | | 463/36 |
| 2015/0077591 | A1 | 3/2015 | Fujiwara | |
| 2015/0227806 | A1 * | 8/2015 | Oami | G06K 9/00221 |
| | | | | 348/222.1 |
| 2015/0262365 | A1 * | 9/2015 | Shimizu | G06K 9/00201 |
| | | | | 382/103 |
| 2015/0339519 | A1 | 11/2015 | Ueta et al. | |
| 2015/0371403 | A1 | 12/2015 | Koyama et al. | |
| 2016/0132755 | A1 | 5/2016 | Ikeda | |
| 2016/0217330 | A1 * | 7/2016 | Oami | G06K 9/00362 |
| 2016/0224829 | A1 * | 8/2016 | Chou | G06T 7/11 |
| 2016/0267330 | A1 * | 9/2016 | Oami | G06K 9/00778 |
| 2016/0283590 | A1 * | 9/2016 | Matsuda | G06K 9/00369 |
| 2018/0063509 | A1 * | 3/2018 | Koppal | H04N 5/2254 |

FOREIGN PATENT DOCUMENTS

| | | |
|---|---|---|
| CN | 102986221 A | 3/2013 |
| CN | 103999096 A | 8/2014 |
| EP | 2327055 B1 | 8/2012 |
| JP | 2009-194439 A | 8/2009 |
| JP | 2011-130203 A | 6/2011 |
| JP | 2012-23573 A | 2/2012 |
| JP | 2012-503817 A | 2/2012 |
| JP | 2015-84517 A | 4/2015 |
| JP | 2015-222881 A | 12/2015 |
| WO | 2012/004907 A1 | 1/2012 |
| WO | 2014/155922 A1 | 10/2014 |
| WO | 2014/207991 A1 | 12/2014 |
| WO | 2015/040929 A1 | 3/2015 |
| WO | 2015/068854 A1 | 5/2015 |

OTHER PUBLICATIONS

Ohinese Office Action for CN Application No. 201780017534.7 dated Feb. 3, 2020 with English Translation.
U.S. Office Action for U.S. Appl. No. 16/082,360 dated Mar. 20, 2020.
Yasuda et al., "Thermo-Key: Human Region Segmentation from Video", Emerging Technologies, IEEE Computer Graphics and Applications, 2004, pp. 26-30.
International Search Report dated May 30, 2017, issued by the International Searching Authority in application No. PCT/JP2017/009884.
U.S. Office Action for U.S. Appl. No. 16/285,398 dated Sep. 17, 2020.
U.S. Office Action for U.S. Appl. No. 16/082,360 dated Sep. 11, 2020.
U.S. Office Action for U.S. Appl. No. 16/285,451 dated Mar. 1, 2021.
U.S. Office Action for U.S. Appl. No. 16/285,398 dated Mar. 8, 2021.

* cited by examiner

Fig. 2
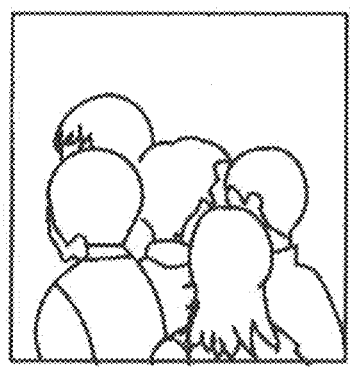
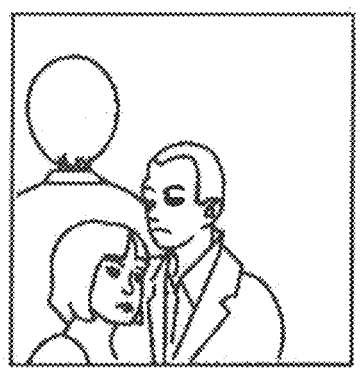

Fig. 3
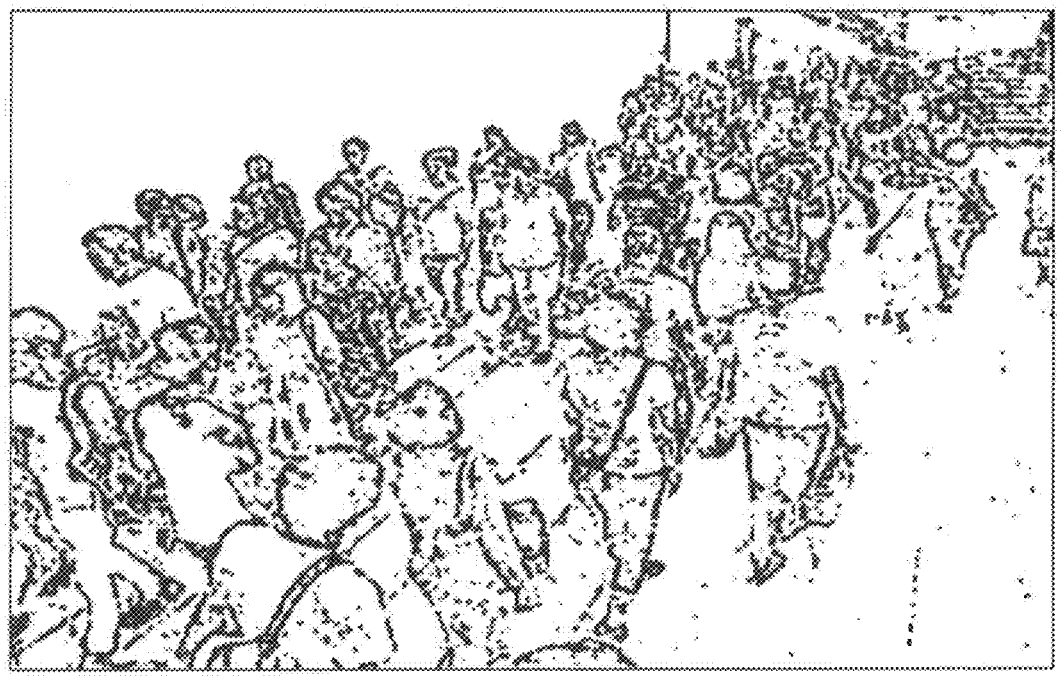
(a)
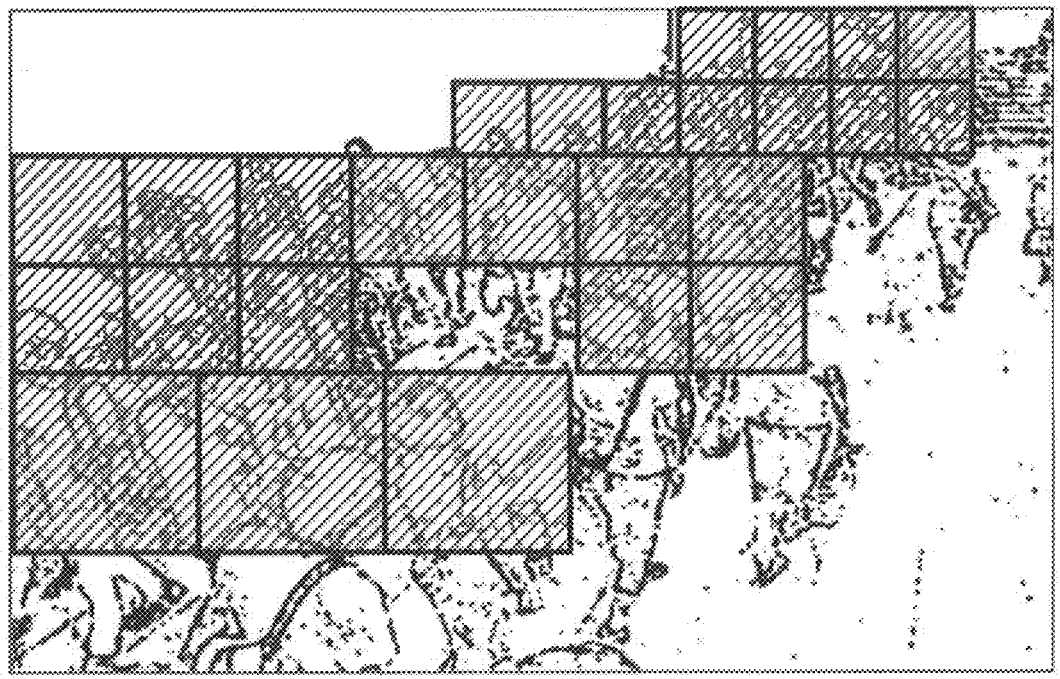
(b)

PRIVACY PROCESSING BASED ON PERSON REGION DEPTH

CROSS-REFERENCE TO RELATED APPLICATIONS

The present application is a continuation application of U.S. patent application Ser. No. 16/082,360 filed on Sep. 5, 2018, which is a National Stage Entry of international application PCT/JP2017/009884, filed Mar. 13, 2017, which claims the benefit of priority from Japanese Patent Application 2016-058401 filed on Mar. 23, 2016, the disclosures of all of which are incorporated in their entirety by reference herein.

TECHNICAL FIELD

The present invention relates to a monitoring system, an image processing device configured to perform privacy processing for an image, an image processing method, and an image processing program recording medium.

BACKGROUND ART

Monitoring systems have been developed to monitor congestion conditions at busy places such as train stations, intersections, and department stores with camera devices installed at such places. Images taken by such camera devices of such a monitoring system may include a number of people, and thus adequate protection of privacy of these people needs to be provided.

To respond to requirements of privacy protection for images, privacy processing has been widely performed by, for example, reducing spatial resolution in person regions that is a region where a person appears in the images.

However, when the privacy processing is applied equally to all the person regions in the images, insufficient privacy protection for the person on the near side due to insufficient blurring or inability to figure out the congestion conditions from the image due to excessive blurring may result.

Examples of related technologies for applying privacy processing to images include technologies described in PTL 1 to PTL 3.

PTL 1 discloses a technology of the privacy processing. The processing includes determining a privacy region for each user in advance and, in response to a user requesting distribution of an image, performing privacy processing to a region requested by the user to distribute the image, at different image processing levels between the user's privacy region and privacy regions of others.

PTL 2 discloses a technology including detecting a person from an image, acquiring positional information on a person region, determining a region state indicating a state of the person region (whether crowd or individual), and setting a masking image corresponding to the region state.

PTL 3 discloses a technology including: when an image processing device projects a browsing prohibition polyhedron on an image, prohibiting browsing of pixels determined to have depth information larger than depth information of the browsing prohibition polyhedron; and allowing browsing of pixels determined to have depth information smaller than the depth information of the browsing prohibition polyhedron. Accordingly, an object to be protected from a browse is prevented from being browsed, while objects positioned on a near side with respect to the corresponding object and requiring no browsing prohibition is allowed to be browsed.

As another technology relating to the invention of the present application, PTL 4 describes an example of technology for detecting a crowd from an image. PTL 5 describes an example of privacy processing. PTLs 6 to 8 describe examples of technologies for sensing an abnormal behavior of a person from an image.

CITATION LIST

Patent Literature

PTL 1: WO No. 2012/004907
PTL 2: JP 2015-222881 A
PTL 3: JP 2012-23573 A
PTL 4: WO No. 2014/207991
PTL 5: JP 2012-503817 A
PTL 6: WO No. 2015/068854
PTL 7: WO No. 2015/040929
PTL 8: WO No. 2014/155922

SUMMARY OF INVENTION

Technical Problem

When privacy processing is applied on an entire image, a problem such as deterioration of visibility may arise.

Accordingly, it is an object of the present invention to provide a monitoring system, an image processing device, an image processing method, and a program recording medium which achieves personal privacy protection while suppressing a reduction in visibility for an image.

Solution to Problem

A monitoring system according to one aspect of the present invention includes:
a camera device;
person region detection means for detecting a person region that is a region where a person appear in an image captured by the camera device, and
privacy processing means for performing, on the person region, privacy processing a strength of which differs according to a depth associated with coordinates of the person region or a predetermined index related to the depth.

An image processing device according to one aspect of the present invention includes:
person region detection means for detecting a person region that is a region where a person appears in an image captured by a camera device, and
privacy processing means for performing, on the person region, privacy processing a strength of which differs according to a depth associated with coordinates of the person region or a predetermined index related to the depth.

An image processing method according to one aspect of the present invention includes:
detecting a person region that is a region where a person appears in an image captured by a camera device, and
performing, on the person region, privacy processing a strength of which differs according to a depth associated with coordinates of the person region or a predetermined index related to the depth.

A program storage medium according to one aspect of the present invention stores a program that causes a computer to execute:
a process of detecting a person region that is a region where a person appears in an image captured by a camera device, and a process of performing, on the person region, privacy processing a strength of which differs according to a depth associated with coordinates of the person region or a predetermined index related to the depth.

Advantageous Effects of Invention

According to the present invention, personal privacy protection is achieved while suppressing a reduction in visibility for an image.

BRIEF DESCRIPTION OF DRAWINGS

FIG. 2 is an explanatory drawing illustrating examples of crowd patch.

FIG. 3 is explanatory drawings illustrating an original image of detection and an example of a result of detection of person regions.

EXAMPLE EMBODIMENT

First Example Embodiment

Figure 1:
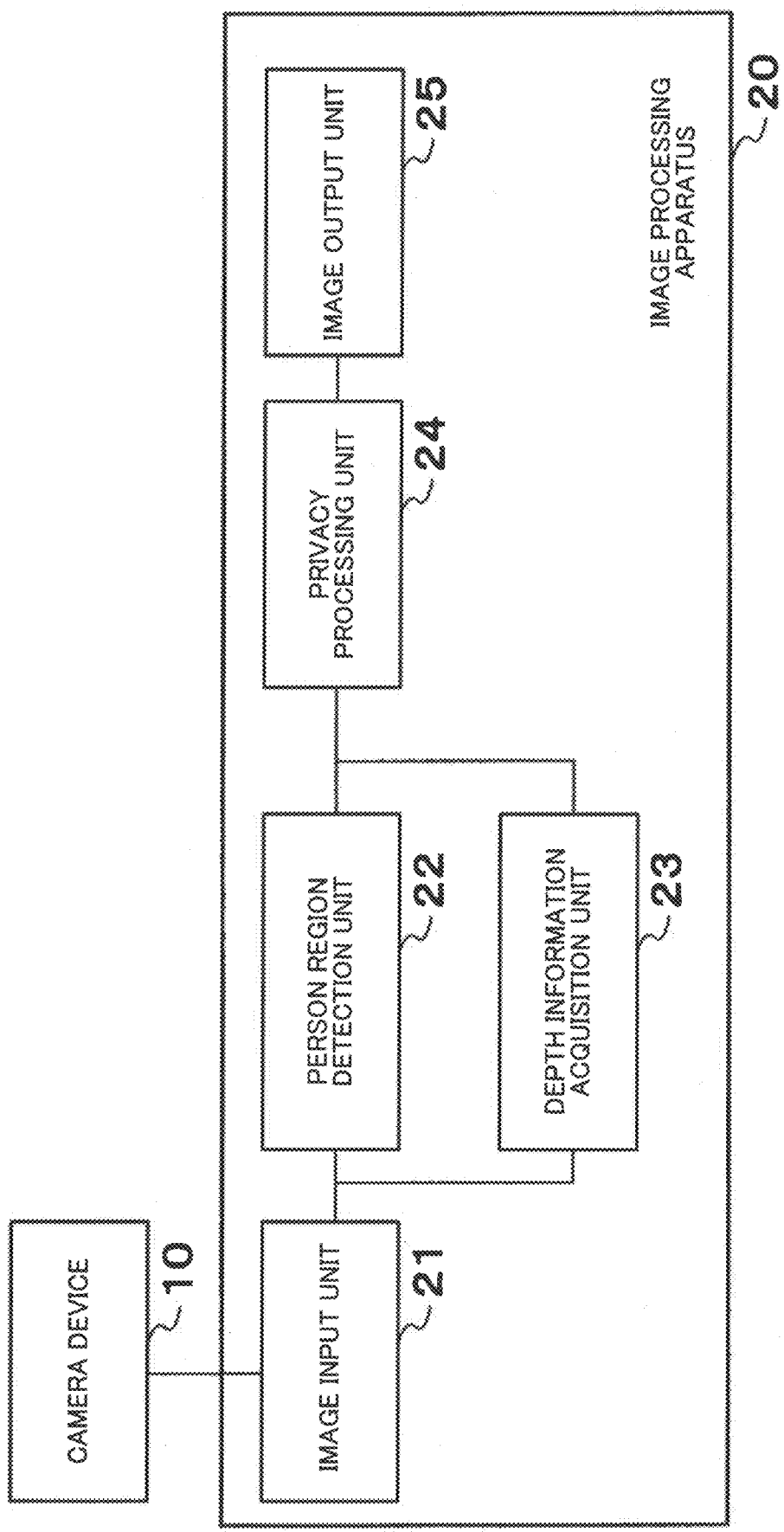
FIG. 1 is a configuration drawing illustrating an example of a monitoring system according to a first example embodiment.

Referring now to the drawings, example embodiments of the present invention will be described. FIG. 1 is a configuration drawing illustrating an example of a monitoring system of a first example embodiment. The monitoring system illustrated in FIG. 1 includes a camera device 10 and an image processing apparatus 20. The image processing apparatus 20 includes an image input unit 21, a person region detection unit 22, a depth information acquisition unit 23, a privacy processing unit 24, and an image output unit 25.

The camera device 10 is a camera device configured to capture an image of a region to be monitored. In the monitoring system of the present example embodiment, the camera device 10 has an imaging range including a region where an unspecified number of people may be imaged such as train stations, intersections, and department stores.

The image input unit 21 receives the image from the camera device 10. The image input unit 21 may receive camera parameters together with the image when the image is captured and also receives an output result from a human sensor directed to a range including at least part of the imaging range of the image at the same time as the image taking, if any.

The person region detection unit 22 detects a region including a person (especially a head portion) in the received image. The person region detection unit 22 may execute predetermined crowd detection processing on the received image and determine a detected region including a crowd as a person region. As used in the present invention the term "crowd" includes a case including only one person.

Any method of detecting the person region other than a method of identifying faces of persons individually from an image and detecting a region may be employed. For example, a method widely referred to as a face recognition processing is excluded. The face recognition processing detects a region including a face by detecting a feature amount indicating characteristics of eyes or a nose as constituents of the face from an image. Examples of the method of detecting a person region include a method of using an infrared ray camera device interlocked with the camera device 10 as a human sensor and determining whether any person is present at positions in a real space corresponding to respective pixels of an infrared image by using the infrared image of the same image range taken by the infrared ray camera device at the same time and the same imaging range as the camera device 10. The method of detecting a person region may include a method of using a device such as a measurement device provided with a light-receiving element configured to emit light for inspection (inspection light) as a human sensor to sense whether the light is reflected or not or to sense attenuation and detecting whether a moving body (human) is present in a radiation range of the inspection light or not. In this case, for example, a plurality of the measurement devices may be arranged in the imaging range at predetermined intervals and whether any person is included in the imaging range or not may be detected based on positional information of the measurement devices.

The method of detecting a person region may include, for example, a method disclosed in PTL 4.

The method disclosed in PTL 4 includes preparing local images of a crowd state generated by a method such as simulation (hereinafter referred to as crowd patches), performing pattern matching of randomly selected rectangular region in the image with respect to the crowd patch and detecting a crowd region including a crowd in the image. Detection of the crowd region from an image may be achieved by the person region detection unit 22 by using a discriminator obtained by machine learning using an information set indicating crowd patches and crowd states of the crowd patches (persons' state) as training data.

As used herein the term "local" is intended to include regions smaller than the region of the image to be detected. A local image of a crowd state corresponds to an image including a set of reference sites of the persons constituting a crowd in such a region (hereinafter, referred to simply as "reference site"). Hereinafter, the local image of the crowd state may be referred to as crowd patch. The crowd patch may include portions of persons other than the reference sites. The local images including various number of sets of reference sites viewed from various angles may be prepared as the crowd patches. Especially, the local images including reference sites of at least two persons may be prepared.

While the local images include the reference sites of a plurality of persons in the method disclosed in PTL 4, the crowd patches in the present example embodiment may include local images including a reference site of one person. This enables detection also of a region including only one person as a crowd region. While the reference site is not specifically limited in the method disclosed in PTL 4, the reference site may be broadened to a range larger than a face such as a range including a head portion or an upper body, so that distinguishable characteristics such as an outline of a single person are provided for also detecting a crowd including only one person. Note that two or more types of reference sites may be specified.

The person region detection unit 22 may set specific regions (rectangular region group) to cover the entire region of an image to be detected. In pattern matching with the rectangular regions, the person region detection unit 22 may change the size of the crowd patches depending on the coordinate on the image, based on the sizes of the reference sites corresponding to the crowd patches and camera parameters indicating position, posture, focal distance, lens distortion, etc., of the camera device 10. For example, the size of reference site of a person included in an image may be derived from these camera parameters. The size of the crowd patch may be expanded or contracted according to the size of the reference site in the image. The size of the crowd patch may be adjusted to the size of the rectangular region set by the coordinate. Other examples may include providing larger crowd patches in a lower region of an image and smaller crowd patches in an upper region of the image. The lower region of the image includes regions nearer to a camera and the upper region of the image includes regions farther from the camera in a real space. Setting of the rectangular region group is not limited to these methods and may be set flexibly. The rectangular region group may be set in an overlapping manner.

By storing information indicating the crowd states of the local images corresponding one-to-one to the crowd patches as described in PTL 4, the person region detection unit 22 may obtain states of crowds (numbers of people, orientations, etc.) in the regions detected from the image by using the crowd patches.

The person region detection unit 22 may detect all the rectangular regions which is determined that a person appears therein, for example, as a result of matching, collectively as a crowd region. For example, the person region detection unit 22 may set a region including a predetermined amount of the region added to the periphery of the rectangular region or a part of the rectangular region (for example, an upper half which most probably includes a face) as the crowd region.

The person region detection unit 22 may determine a crowd region detected to be a person region in a manner described above and output a representative coordinate and the size of the crowd region. The representative coordinate of the person region may be, for example, a central coordinate of a specific region determined to be a person region. The person region may have two or more representative coordinates. When a crowd patch is provided with information indicating head positions in the corresponding crowd patch as information indicating crowd state for example, the coordinates of the head positions in the specific region may be determined as representative coordinates.

FIG. 2 is explanatory drawings illustrating examples of the crowd patch. FIG. 3 is explanatory drawings illustrating an original image of detection and an example of a result of detection of person regions. An image (a) in FIG. 3 is the explanatory drawing illustrating the example of the original image of detection, and an image (b) in FIG. 3 is the explanatory drawing illustrating the result of detection of the person regions. The image (b) in FIG. 3, hatched rectangular regions represent the detected person regions. The images illustrated in FIG. 3 are binary images acquired by the camera device 10 for emphasizing outlines of persons. However, any gradation number is applicable for the image. The same applies to other image examples.

The person region detection unit 22 may analyze an input image by each specific region (each rectangular region in the drawing, for example) and determine whether at least one person appears or not in each specific region via pattern matching with the crowd patches. In other words, the person region detection unit 22 does not recognize individual faces of people included in an image, but recognizes a combination of reference sites of at least one person included in a specific region in the image as a batch via comparison and collation with local images prepared in advance. Accordingly, simple processing is achieved and a processing load may be alleviated.

The depth information acquisition unit 23 acquires depth information at coordinates corresponding one-to-one to pixels included in an image or coordinates of person regions in the image (for example, representative coordinates).

The depth information relates to the depth of a position in a real space corresponding to the distance of the coordinate with respect to the camera. The depth information may represent the depth of the position in the real space corresponding to the coordinate, or may represent a predetermined index related to the depth. Examples of the latter depth information include, for example, information correlating with the depth or information that may lead to estimation of the magnitude of the depth. Examples of the depth information as described above include, for example, information indicating the size of the person region having a coordinate determined as a representative coordinate or the size of the reference site of a person included in the person region.

When information indicating the sizes of the person regions and the sizes of the reference sites is used as depth information, and the depth information may be acquired by the person region detection unit 22. In this case, the depth information acquisition unit 23 may be omitted.

The depth information acquisition unit 23 may acquire, for example, the depth information of a target coordinate from the camera parameters of the camera device 10.

Figure 4:
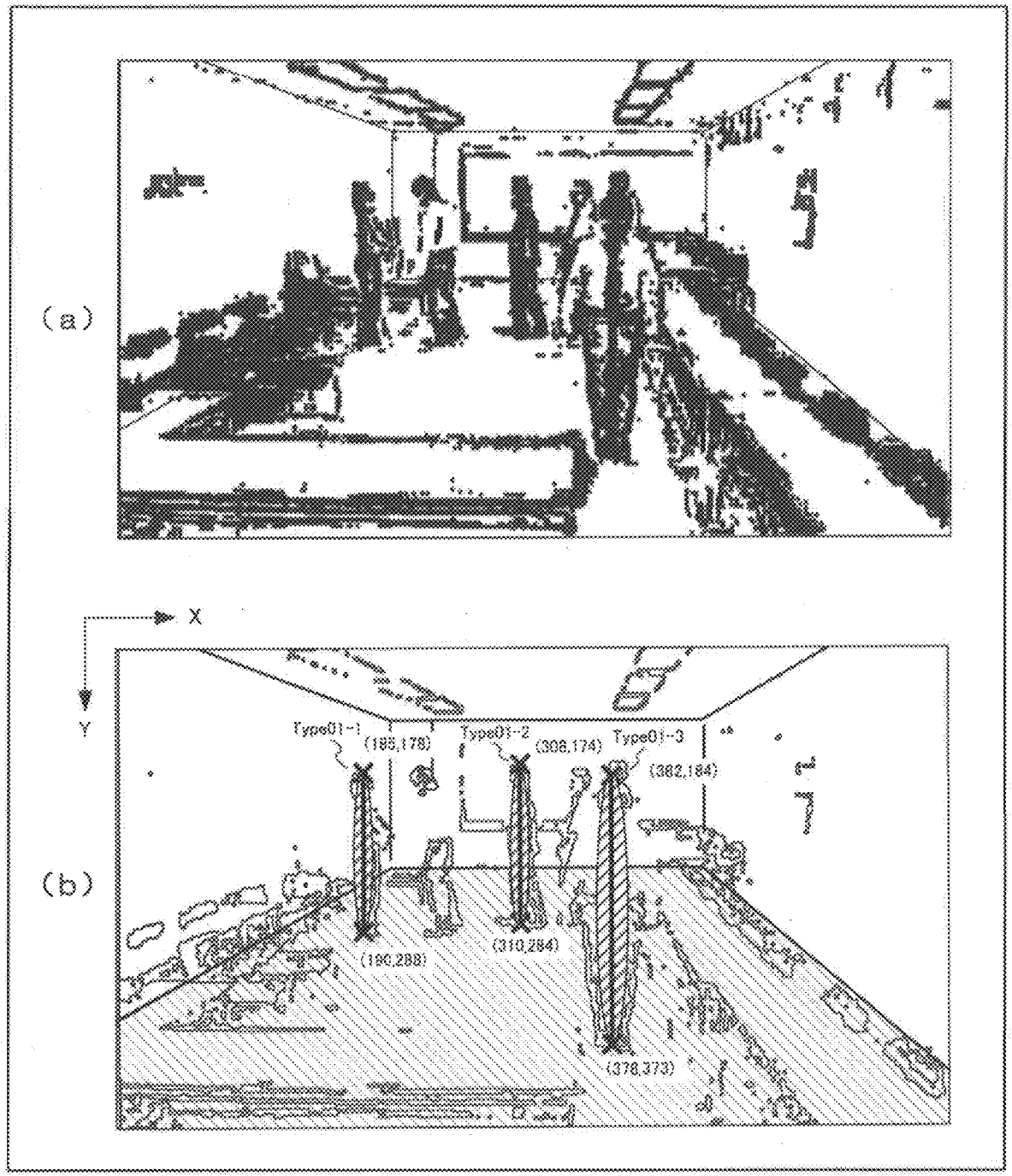
FIG. 4 is explanatory drawings illustrating an example of an image three-dimensional information.

For example, the depth information acquisition unit 23 may estimate image three-dimensional information indicating the three-dimensional size of a reference object in an image acquired by the camera device 10 illustrated in FIG. 4 from the camera parameters related to the position and the posture of the camera such as height, depression angle, horizontal view angle, diagonal view angle line of the camera device 10.

The reference object in this case may be, for example, a person having a predetermined height. The image three-dimensional information may be a pair of coordinates corresponding to the position (standing point) of a reference object (for example, a person being 168 cm tall) and the height (the top) in an image. The image three-dimensional information may be of any information indicating where and how large (scale) a specific object with known size and position appears in an image.

FIG. 4 is explanatory drawing illustrating an example of ab image three-dimensional information. An image (a) in FIG. 4 is an explanatory drawing illustrating an example of an image acquired by the camera device 10. An image (b) in FIG. 4 is an explanatory drawing illustrating the example of the image three-dimensional information in the image illustrated in FIG. 4. An image (b) in FIG. 4 illustrates three pairs of coordinate sets {(X1, Y1), (X2, Y2)} corresponding to the standing point and the top of the reference objects in the image.

For example, the depth information acquisition unit 23 may estimate the image three-dimensional information as illustrated in the image (b) in FIG. 4, based on the camera parameters of the camera device 10. The depth information acquisition unit 23 may acquire image three-dimensional information by a user designating the image three-dimensional information as illustrated in the image (b) in FIG. 4 on an image acquired by the camera device 10. Based on the image three-dimensional information acquired in this manner, the depth at the target coordinate of the image may be estimated. When the head of a person appears at a target pixel, the depth information acquisition unit 23 may obtain the depth by obtaining the position of the person in the real space.

The privacy processing unit 24 performs privacy processing on the person regions in an image. The privacy processing unit 24 performs the privacy processing a strength of which differs according to a depth or the index related to the depth indicated by the depth information associated with coordinates of the person region. The privacy processing unit 24 may determine, for example, a position in the real space corresponding to the representative coordinate of the person region to be the position in the real space of a person in the person region, and perform the privacy processing the strength (high or low) of which differs according to a depth or the index related to the depth at the position. In the following description, a case where the depth information indicates the depth. However, when the depth information indicates the index related to the depth, the description may be read by replacing the magnitude relationship of the depth by the magnitude relationship of the index.

Note that the larger the depth indicated by depth information corresponding to a representative coordinate of a person region, the weaker the privacy processing that the privacy processing unit 24 performs for the person region, and the smaller the depth, the stronger the privacy processing for the person region. The privacy processing unit 24 may also be configured to perform first privacy processing when the depth is equal to or larger than a predetermined threshold value and perform second privacy processing when the depth is smaller than the predetermined threshold value. The second privacy processing is stronger than the first privacy processing.

As used herein the term the "strength of privacy processing" is intended to include the degree of blurring. In other words, the strength of privacy processing corresponds to the level of resolution. More specifically, the term "the privacy processing is strong" means that the resolution of an image after having been subjected to the processing is lower than an image subjected to weak privacy processing", while the term "the privacy processing is weak" means that the resolution of an image after having been subjected to the processing is higher than an image subjected to strong privacy processing. A process described in PTL 5, for example, may be used as a method of privacy processing. In the method in PTL 5, in weak privacy processing, a spatial resolution may be reduced for a narrower pixel range than privacy processing, and in strong privacy processing, a spatial resolution may be reduced for a wider pixel range than the privacy processing.

Figure 5:
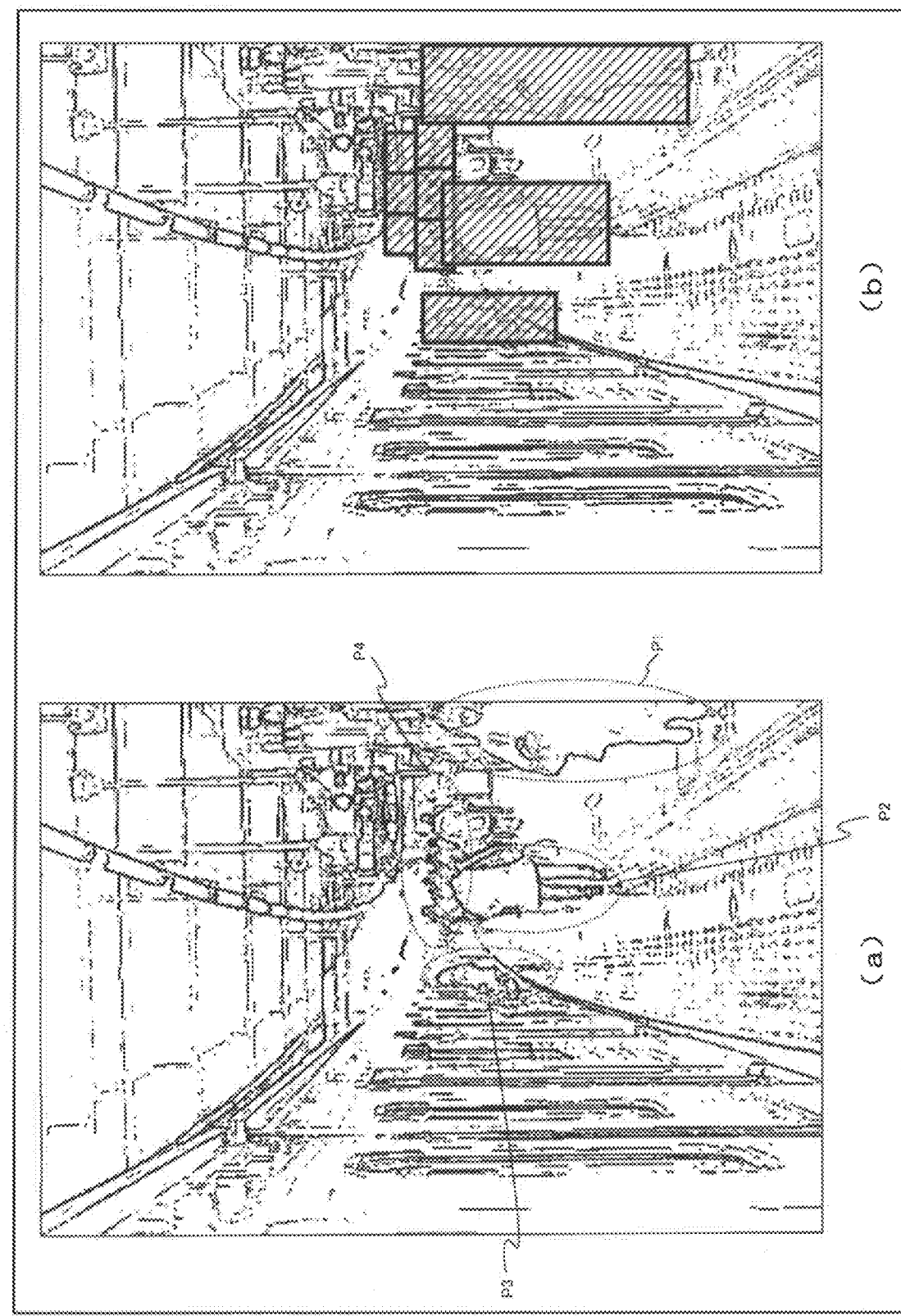
FIG. 5 is explanatory drawings illustrating an original image of detection and another example of a result of detection of person regions.

FIG. 5 is explanatory drawings illustrating an original image of detection and another example of a result of detection of person regions. An image (a) in FIG. 5 illustrates an image of a platform of a station taken by the camera device 10. The image (a) illustrated in FIG. 5 includes mainly four types of person regions as surrounded by ovals of broken line. In the image (a) in FIG. 5, P1 is an example of a person region including a person standing alone on the platform at a nearest position to the camera. P2 is an example of a person region of a person standing alone at an intermediate part of the platform. P3 is an example of a person region of a person standing alone on a far side of the platform. P4 is an example of a person region (crowd region) of a plurality of people on a far side of the platform. The image (b) in FIG. 5 illustrates a result of detection of person regions in the image illustrated in the image (a) in FIG. 5. In the image (b) in FIG. 5, hatched rectangular regions indicate detected person regions.

In an example illustrated in the image (b) in FIG. 5, the sizes of the respective person regions are inputted as depth information. In such a case, for example, the privacy processing unit 24 may perform strong privacy processing on relatively large (having at least a predetermined size) person regions as seen in a lower part of the image and perform weak privacy processing on relatively small person regions (smaller than the predetermined size) as seen in an upper part of the person. In this case, the privacy processing unit 24 may perform the privacy processing by using parameters related to the strength of the privacy processing such as a conversion window size specified depending on the sizes of the person regions for the strength of the privacy processing.

The method of the privacy processing is not specifically limited. The privacy processing unit 24 may perform the privacy processing on person regions in an image by changing the strength based on the depth information of the corresponding regions by using a known method. A configuration not to perform the privacy processing is also applicable when the depth is equal to or larger than the predetermined value. The predetermined value may be set to any depth value providing a sufficient distance to protect the privacy without performing the privacy processing. Setting a plurality of threshold values to perform multi-stage determination such as three-stage determination is also conceivable. As an example of conceivable determination, the first privacy processing is performed when the depth is smaller than the first threshold value; the second privacy processing is performed when the first threshold value is not larger than the depth and the depth is not larger than the second threshold value; and no privacy processing is performed when the second threshold value is smaller than the depth. In this case, the first privacy processing is strong privacy processing and the second privacy processing is weak privacy processing.

The image output unit 25 outputs an image subjected to privacy processing by the privacy processing unit 24. Examples of the image output unit 25 here include liquid-crystal displays, and compact terminals (smartphones, tablets).

Figure 6:
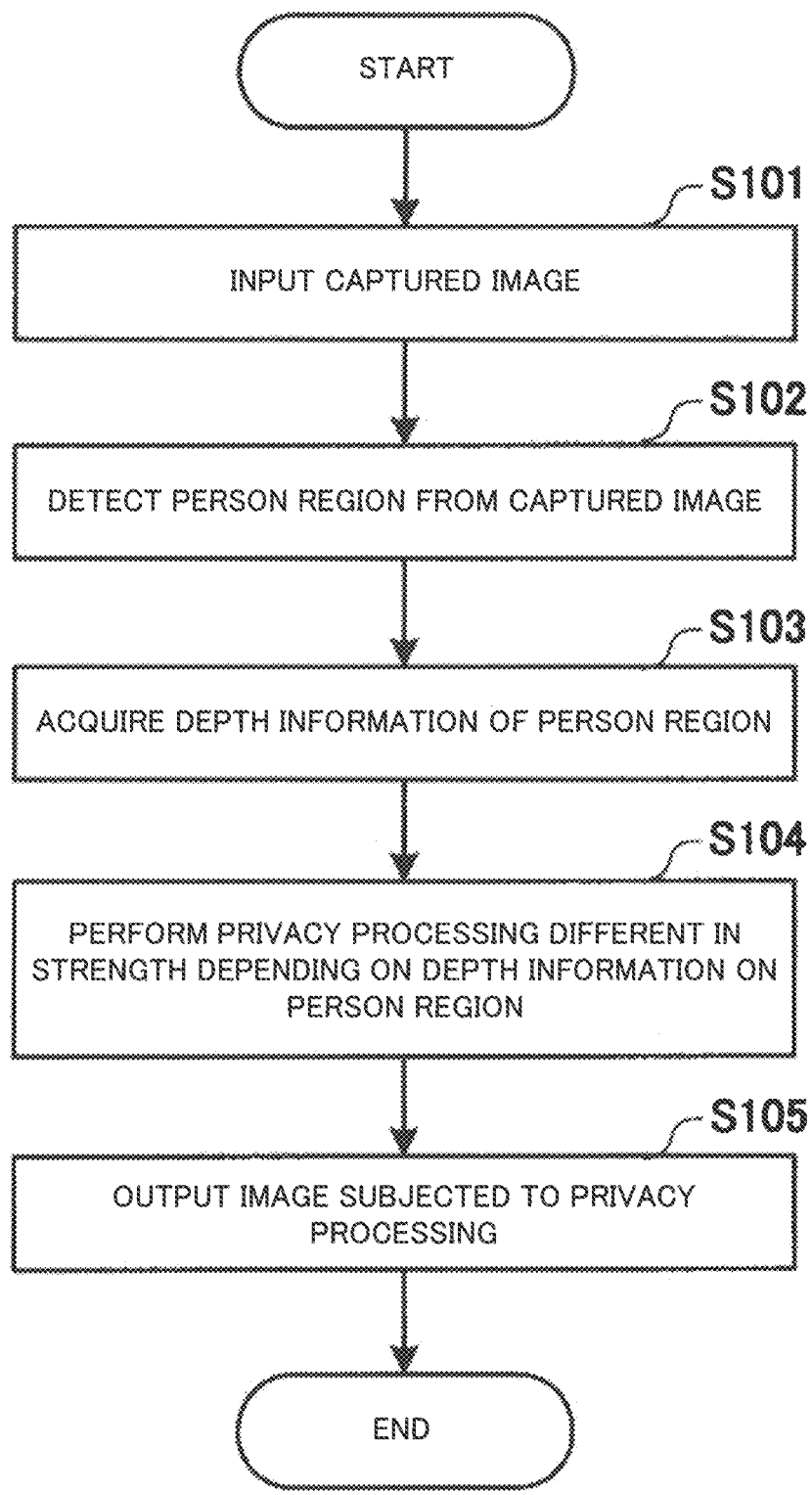
FIG. 6 is a flowchart illustrating an example of an operation of the monitoring system according to the first example embodiment.

An operation of the present example embodiment will be described below. FIG. 6 is a flowchart illustrating an example of the operation of the monitoring system according to the present example embodiment. In the example illustrated in FIG. 6, the image input unit 21 receives an image captured by the camera device 10 as an image to be subjected to privacy processing (Step S101). The image input unit 21 may import camera parameters together with the image.

Next, the person region detection unit 22 detects a person region from the image by using a predetermined crowd detection processing (Step S102). Detecting the person region, based on information obtained from a human sensor, is also applicable. Specifically, a region including a person is specified by the human sensor that covers an imaging region of an image captured by the camera device 10 in a sensing range, and the region in the image corresponding to the specified region is detected as a person region. The person region detection unit 22 may also be configured to detect the person region by using the human sensor and crowd detection processing.

Specifically, the person region detection unit 22 specifies the region including a person by the human sensor, and then specifies a first region in the image corresponding to the specified region. Subsequently, the person region detection unit 22 may also be configured to detect the person region from the first region by applying predetermined crowd detection processing to the first region.

Next, the depth information acquisition unit 23 acquires the depth information of the person region (Step S103).

Next, the privacy processing unit 24 performs the privacy processing on the person regions in an image by changing the strength, based on the depth information of the corresponding regions (Step S104).

Finally, the image output unit 25 outputs an image subjected to the privacy processing (Step S105).

In the above-described example, the processing in Step S103 is performed after the processing in Step S102. However, the timing of performance of Step S103 is not limited thereto. For example, the monitoring system may perform the processing in Step S103 in parallel to the processing in Step S102, or may be performed at predetermined timing such as every time when the position and posture of the camera are fixed.

As described thus far, according to the present example embodiment, a person region is detected from an image captured by the camera device 10 and then privacy processing different in strength is performed on the detected person region according to the depth or an index related to the depth. Accordingly, personal privacy protection is achieved while suppressing a reduction in visibility for an image. As the range subjected to the privacy processing is limited, the processing load may be reduced. In addition, by employing a method of detecting a person region, based on the feature amount of a batch including a combination of reference sites of at least one person included in an image, or a method of detecting a person region by using the human sensor, both suppressing a reduction in visibility for an image and privacy protection are achieved with further lesser processing load.

When the method of detecting a person region by using the human sensor is employed, regions usually free of necessity of privacy protection such as a person in a poster may be advantageously excluded from an object of the privacy processing.

Although one camera device 10 is illustrated in FIG. 1, the number of the camera devices provided in the monitoring system is not limited to one. For example, the monitoring system may be connected to two or more camera devices 10.

Although FIG. 1 illustrates an example in which the image processing apparatus 20 includes the image output unit 25, a configuration in which the image processing apparatus 20 does not include the image output unit 25 is also applicable. In this case, the image processing apparatus 20 may be configured to output images subjected to privacy processing to a predetermined server device, for example, connected via a network.

Second Example Embodiment

Figure 7:
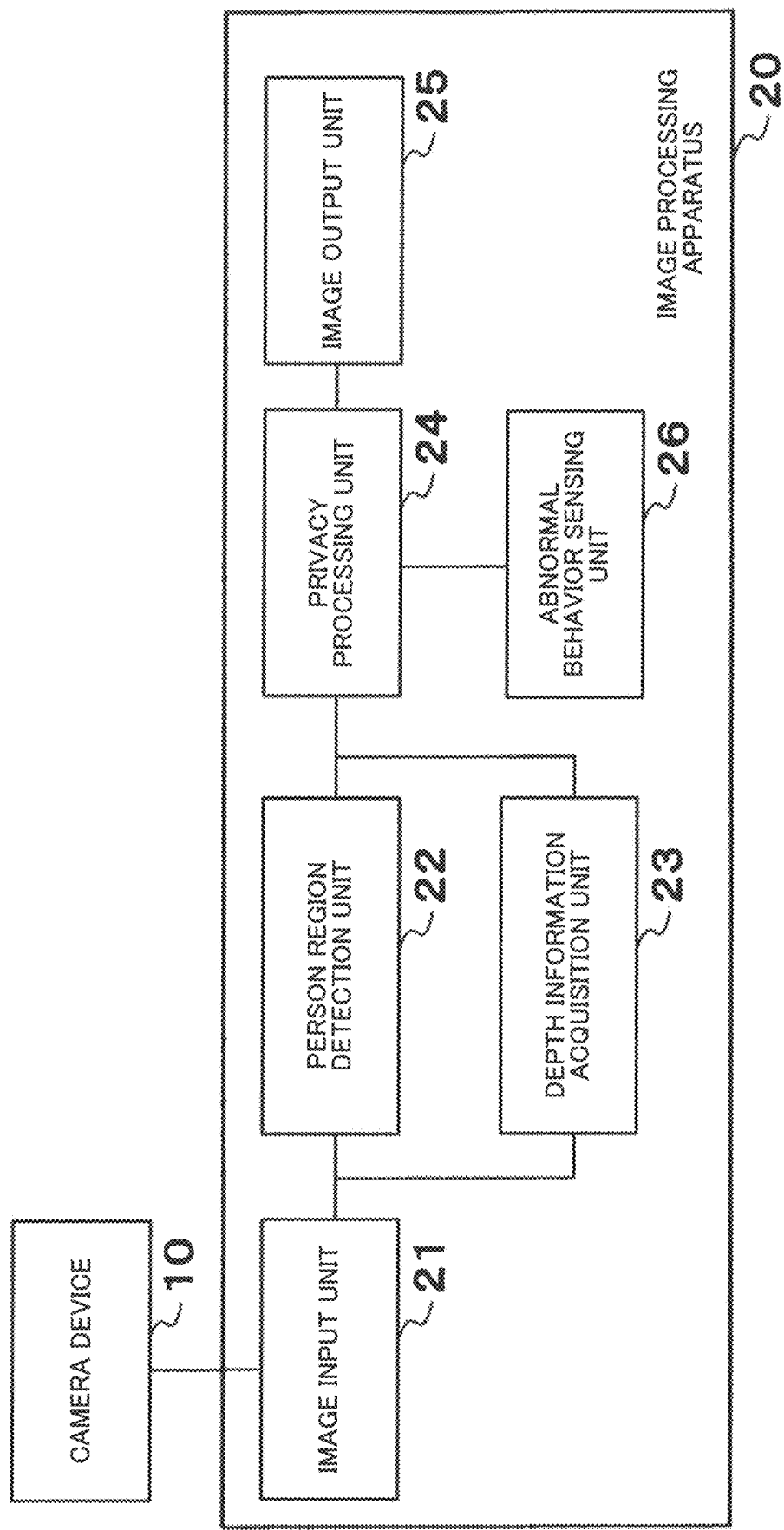
FIG. 7 is a configuration drawing illustrating an example of a monitoring system according to a second example embodiment.

A second example embodiment of the present invention will be described below. FIG. 7 is a configuration drawing illustrating an example of a monitoring system of the present example embodiment. A monitoring system illustrated in FIG. 7 is different from the monitoring system in the first example embodiment illustrated in FIG. 1 in that the image processing apparatus 20 further includes an abnormal behavior sensing unit 26.

The abnormal behavior sensing unit 26 senses an abnormal behavior of a person from an input image. The abnormal behavior sensing unit 26 may detect an abnormal behavior by determining whether a predetermined collective movement of people between images in temporal sequence has occurred or not when information indicating a persons' state, for example as a result of analysis by the person region detection unit 22.

The person region detection unit 22 of the present example embodiment outputs information on the number or orientations of persons in a person region as information indicating the persons' state together with a representative coordinate and the size of the person region.

In such a case, the abnormal behavior sensing unit 26 may sense a flow of a group of persons such as gathering or separating from temporally successive images, based on the information of the respective person regions detected from the image. The abnormal behavior sensing unit 26 may then sense an abnormal behavior when the degree of clumping in such a collective flow of people changes more than a predetermined amount between images in temporal sequence within a predetermined period or in a certain frame.

In addition, when an aversive behavior, the same group as the group sensed before, or a crawling behavior is detected, it may be considered that an abnormal behavior is sensed. A method described in PTL 6, for example, may be used as a method of sensing the aversive behavior. A method described in PTL 7 may be used as a method of sensing the same group as the group detected before. A method described in PTL 8, for example, may be used as a method of sensing the clawing behavior.

Note that the abnormal behavior sensing unit 26 may sense the abnormal behavior from an image only with self processing without using the information indicating the persons' state obtained from the person region detection unit 22. In this case, the abnormal behavior sensing unit 26 may prepare a collating image for sensing the abnormal behavior.

In the present example embodiment, the privacy processing unit 24 may be configured to perform privacy processing for an image, for example, when an abnormal behavior is sensed by the abnormal behavior sensing unit 26.

When the abnormal behavior is sensed, a disclosure different from normal times may be effected such that an image which is usually recorded only is displayed on a monitor. In the range of normal disclosure, privacy processing is not necessary. However, when a disclosure different from the normal disclosure is effected, privacy protection may be desired. According to the present example embodiment, the privacy processing is performed only when an abnormal behavior is sensed, and thus an adequate (automatic and immediate) reaction may be given when the abnormal behavior is sensed.

In contrast, the privacy processing unit 24 may be configured not to perform privacy processing for an image, for example, when an abnormal behavior is sensed by the abnormal behavior sensing unit 26.

When an abnormal behavior is sensed, specifying a person causing the abnormal behavior may be required. The present example embodiment may be configured to perform privacy processing in a normal condition with no abnormal behavior sensed and not to perform the privacy processing only when an abnormal behavior is sensed. Therefore, adequate (automatic, and quicker than a case of performing the privacy processing) action may be given when the abnormal behavior is sensed.

Third Example Embodiment

Figure 8:
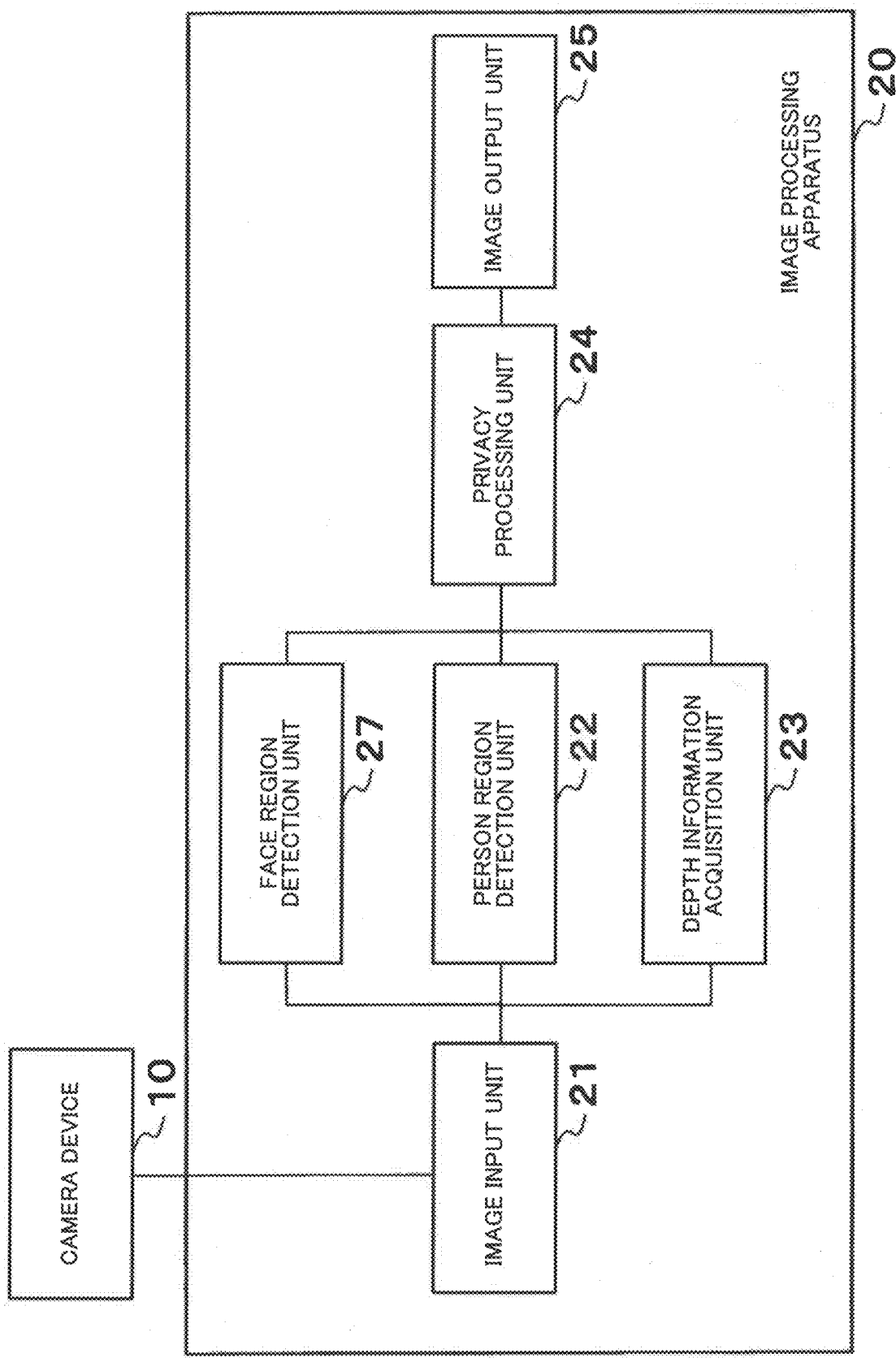
FIG. 8 is a configuration drawing illustrating an example of a monitoring system according to a third example embodiment.

A third example embodiment of the present invention will be described below. FIG. 8 is a configuration drawing illustrating an example of a monitoring system of the present example embodiment. The monitoring system illustrated in FIG. 8 is different from the monitoring system in the first example embodiment illustrated in FIG. 1 in that the image processing apparatus 20 further includes a face region detection unit 27.

The face region detection unit 27 performs face recognition for a predetermined part of region in an input image, and detects a face region where the face is present. Here, regions targeted by the face region detection unit 27 for performing face recognition may be regions not recognized as person region by the person region detection unit 22, or may be a region meeting predetermined conditions such that the depth of a position in a corresponding real space in a region in an image does not exceed a predetermined value.

The privacy processing unit 24 of the present example embodiment performs privacy processing, based on the depth information not only for person regions detected by the person region detection unit 22 but also for a face region detected by the face region detection unit 27.

For example, the monitoring system may make the person region detection unit 22 analyze the entire part of the image acquired by the camera device 10 first, and then make the face region detection unit 27 analyze regions not detected as a person region as a result of the analysis.

For example, the monitoring system may divide regions in the image acquired by the camera device 10 into two groups by the magnitude of the depth at the positions in the corresponding real space, make the person region detection unit 22 analyze for divided regions with larger depths, and make the face region detection unit 27 analyze the divided regions with smaller depths. When the camera parameters are fixed, the user may divide regions of the image into two or more groups and specify a method of analysis for each of the divided regions. Note that specifying the method of analysis may include specifying not to perform any analysis. The user may specify the person region detection unit 22 to analyze regions including a face in the image smaller than a predetermined value and specify the face region detection unit 27 to analyze regions including a face larger than the predetermined value. The user may also specify not to perform any analyzation for regions including no face of a person such as regions including only a ceiling or a wall. The person region detection unit 22 and the face region detection unit 27 may perform analyzation only for regions specified by the user.

As described thus far, according to the present example embodiment, privacy processing may be performed efficiently by combining the face recognition processing.

Configuration of the example embodiments described above may be combined. For example, in the second example embodiment, whether the privacy processing is always performed or the privacy processing is performed when an abnormal behavior is sensed may be specified. For example, in the third example embodiment, face recognition processing may be combined as a method of detecting person regions. The patterns of combination are not limited to the patterns described above.

Figure 9:
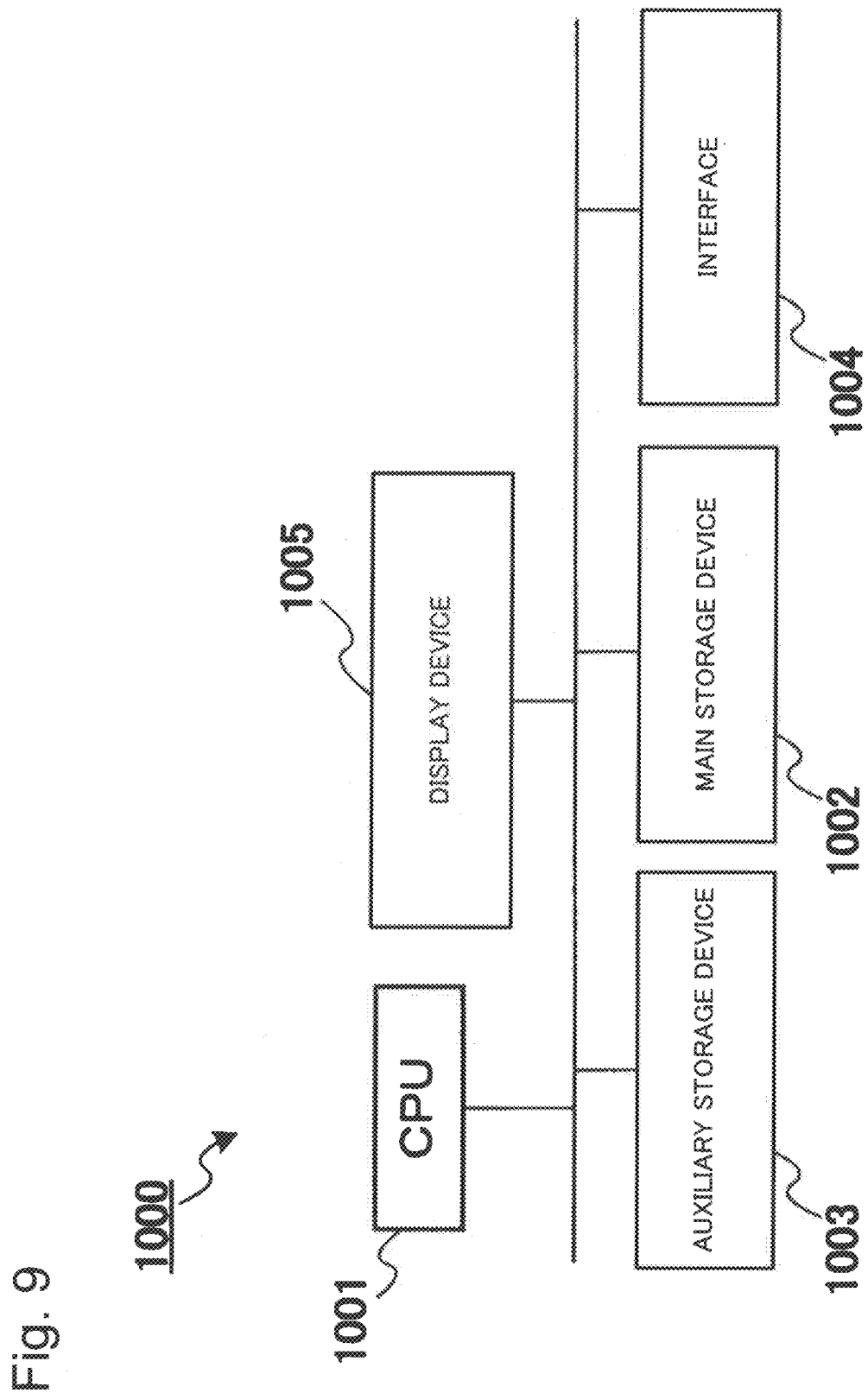
FIG. 9 is a schematic block diagram illustrating a configuration example of a computer according to the example embodiments of the present invention.

A configuration example of a computer according to the example embodiments of the present invention will be described below. FIG. 9 is a block diagram illustrating a general configuration example of a computer according to the example embodiments of the present invention. A computer 1000 includes a Central Processing Unit (CPU) 1001, a main storage device 1002, an auxiliary storage device 1003, an interface 1004, and a display device 1005.

Respective processing parts in the monitoring system described above (the image input unit 21, the person region detection unit 22, the depth information acquisition unit 23, the privacy processing unit 24, the image output unit 25, the abnormal behavior sensing unit 26, and the face region detection unit 27) may be implemented, for example, by the computer 1000 configured to operate as the image processing apparatus 20. In this case, the operations of the respective processing parts may be stored in the auxiliary storage device 1003 in a form of program. The CPU 1001 reads out the program from the auxiliary storage device 1003, deploys the program in the main storage device 1002, and perform predetermined processing in the respective example embodiments according to the deployed program.

The auxiliary storage device 1003 is an example of a medium not temporary, but tangible. Other examples of the medium not temporary but tangible include magnetic disks, magneto optical disks, CD-ROMs, DVD-ROMs, and semiconductor memories connected via an interface 1004. When the program is distributed to the computer 1000 via a communication line, the computer 1000 may deploy the program in the main storage device 1002 upon reception of the program, and perform predetermined processing in the respective example embodiments.

The program may be configured to achieve part of the predetermined processing in the respective example embodiments. Furthermore, the program may be a differential program configured to achieve the predetermined processing in the respective example embodiment via a combination with other programs already stored in the auxiliary storage device 1003.

Depending on the contents of processing in the example embodiment, part of components of the computer 1000 may be omitted. For example, the display device 1005 may be omitted when image having been subjected to privacy processing is outputted to a separate server connected, for example, via a network. Although illustration is omitted in FIG. 9, the computer 1000 may be provided with an input device depending on the contents of processing in the example embodiments. For example, when the monitoring system receives an input of command related to an analysis method for specific region in an image acquired by the camera device 10 from a user, the input device for inputting the command may be provided.

Part of or all the components in each of the devices are implemented by a universal or specific circuitry, a processor, or a combination. Each of these components may be composed of a single chip, or may include a plurality of chips connected via buses. Part or all of each of the components in the respective devices may be implemented by a combination of the circuitry described above and a program.

When part of or all the components in each of the devices are implemented by a plurality of information processing devices or circuitries, the plurality of information processing devices or the circuitries may be located either collectively or discretely. For example, each of the information processing devices or the circuitries may be implemented in a form of being connected via a communication network such as a client and server system and a cloud computing system.

Figure 10:
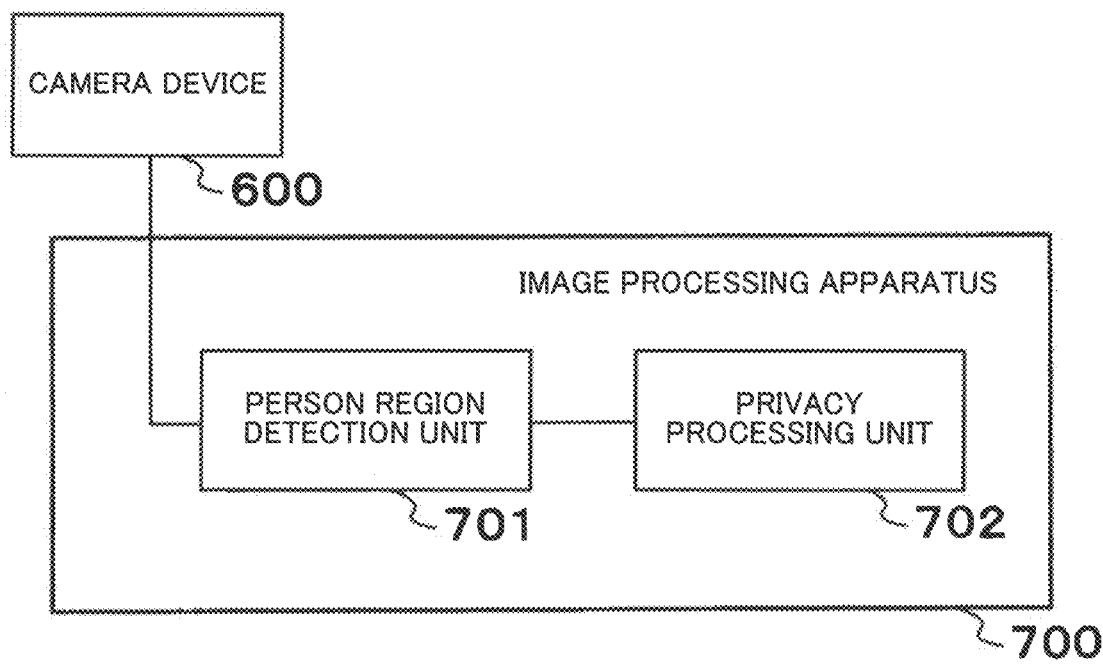
FIG. 10 is a block diagram illustrating an outline of the present invention.

Next, outlines of the monitoring system and the image processing device according to the present example embodiment will be described. FIG. 10 is a block diagram illustrating an outline of the monitoring system according to the present example embodiment. As illustrated in FIG. 10, the monitoring system according to the present example embodiment includes a camera device 600, a person region detection unit 701, and a privacy processing unit 702.

The person region detection unit 701 detects person regions that is a region where a person appears in an image captured by the camera device 600.

The privacy processing unit 702 is configured to perform, on the person region, privacy processing the strength of which differs according to a depth or a predetermined index related to the depth indicated by the depth information associated with coordinates of the person region. As used herein the term "depth" is intended to include a distance of the position of a coordinate determined at least as a person region in the image with respect to the camera device in a corresponding real space.

In this configuration, personal privacy protection while suppressing a reduction in visibility for an image.

Figure 11:
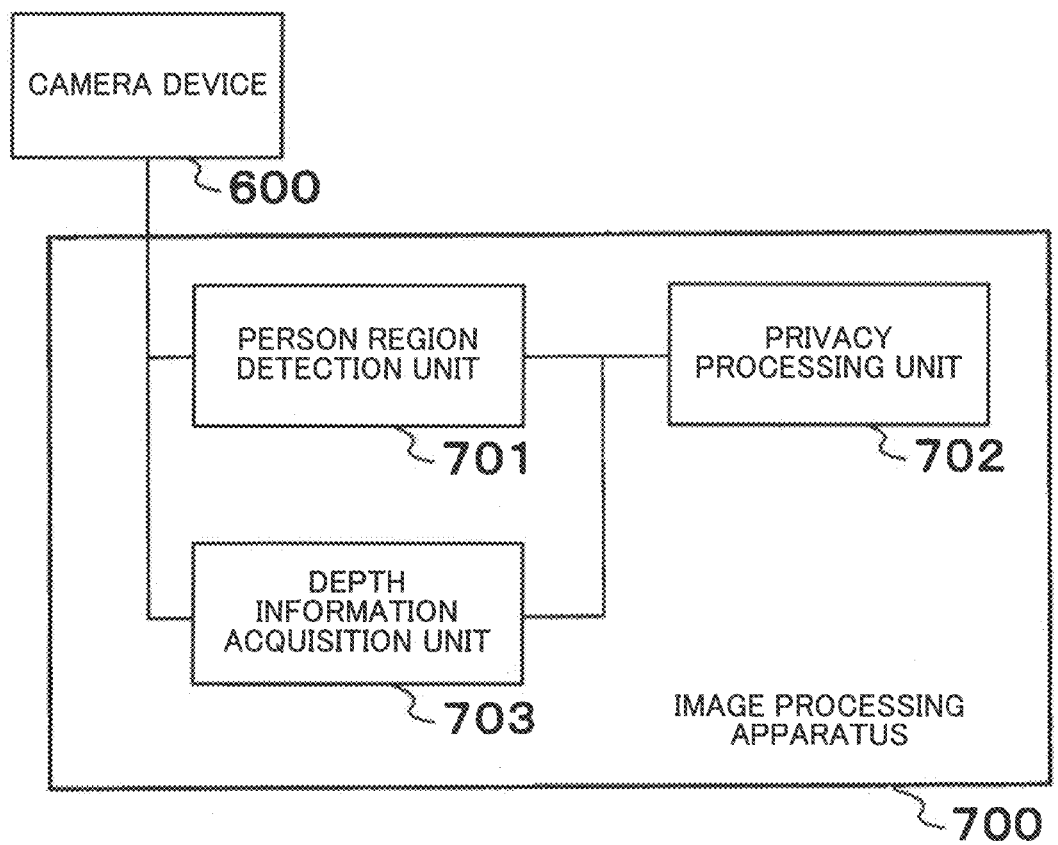
FIG. 11 is a block diagram illustrating another example of the monitoring system according to the present invention.

As illustrated in FIG. 11, the monitoring system may be provided further with a depth information acquiring unit 703.

The depth information acquiring unit 703 may acquire depth information indicating the depth or a predetermined index related to the depth. The depth information acquiring unit 703 may acquire depth information indicating the depth or a predetermined index related to the depth corresponding at least to the coordinate of the person region in an image.

In this configuration, the privacy processing unit 702 may perform privacy processing the strength of which differs according to the depth information.

The person region detection unit 701 may determine whether a person appears or not for each of the specific regions set in an image, detect the specific regions which is determined that a person appears therein as person regions and the privacy processing unit 702 may perform privacy processing for each of the detected person regions.

The person region detection unit 701 may determine whether a person appears or not in the specific region based on the local image including a reference site of a person.

The local image may be an image indicating a set of reference sites of persons extending over a range larger than the face, for example.

The person region detection unit 701 may also determine whether a person appears or not in the specific region based on local images expressing reference sites of two or more persons constituting a crowd.

The person region detection unit 701 may determine whether a person appears or not in the specific region by using a discriminator obtained by machine learning using a combination of local images and information indicating persons' states in the local image as a training data.

The size of the person region or the size of the above-described reference site included in the person region may be used as the predetermined index related to the depth.

The person region detection unit 701 may set specific regions having different sizes in an image.

The person region detection unit 701 may also detect a person region from an image, based on information obtained by a human sensor including a region of the image acquired by the camera device within a sensing range.

The monitoring system may also include an abnormal behavior sensing unit (for example, the above-described abnormal behavior sensing unit 26) configured to analyze an image acquired by the camera device 10 and sense an abnormal behavior of a person from the images, and the privacy processing unit 702 may display the image acquired by the camera device without performing the privacy processing when the abnormal behavior is sensed.

Although the present application has been described thus far with reference to the present example embodiments and examples, the present application is not limited to the example embodiments and the examples described above. In other words, configurations and details of the present invention may be modified in various manner understood by those skilled in the art without departing from the scope of the present invention.

Part or the entire part of the example embodiments described above may be described as the additional statements given below, but is not limited to the followings.

(Supplementary Note 1)

A monitoring system including:

a camera device;

person region detection means for detecting a person region that is a region where a person appears in an image captured by the camera device, and privacy processing means for performing, on the person region, privacy processing a strength of which differs according to a depth associated with coordinates of the person region or a predetermined index related to the depth.

(Supplementary Note 2)

The monitoring system according to Supplementary note 1, including;

depth information acquiring means for acquiring depth information indicating the depth or the predetermined index related to the depth, wherein the privacy processing means performs privacy processing the strength of which differs according to the depth information.

(Supplementary Note 3)

The monitoring system according to Supplementary note 1 or Supplementary note 2, wherein the person region detection means determines whether a person appears or not for each of specific regions set in the image, and detects a specific region which is determined that a person appears therein as a person region, and the privacy processing means performs privacy processing for each of the detected person region.

(Supplementary Note 4)

The monitoring system according to Supplementary note 3, wherein the person region detection means determines whether a person appears or not in each of the specific regions, based on a local image including a reference site of a person.

(Supplementary Note 5)

The monitoring system according to Supplementary note 4, wherein the person region detection means determines whether a person appears or not in each of the specific regions, based on the local image expressing a plurality of the reference sites of two or more persons constituting a crowd.

(Supplementary Note 6)

The monitoring system according to Supplementary note 4 or Supplementary note 5, wherein the person region detection means determines whether a person appears or not in each of the specific regions by using a discriminator obtained by machine learning, the machine learning uses training data including a combination of the local image and information indicating a persons' state in the local image.
(Supplementary Note 7)
The monitoring system according to Supplementary note 4 or Supplementary note 5, wherein a size of the person region or a size of the reference site included in the person region is used as the predetermined index related to the depth.
(Supplementary Note 8)
The monitoring system according to any one of Supplementary note 3 to Supplementary note 7, wherein the person region detection means sets the specific regions having different sizes in the image.
(Supplementary Note 9)
The monitoring system according to any one of Supplementary note 1 to Supplementary note 8, wherein the person region detection means detects a person region from the image, based on information obtained by a human sensor, and the human sensor has a sensing range covering an imaging region of the image acquired by the camera device.
(Supplementary Note 10)
The monitoring system according to any one of Supplementary note 1 to Supplementary note 9, including:
abnormal behavior sensing means for sensing an abnormal behavior of a person from the image by analyzing the image,
wherein the privacy processing means does not performs privacy processing when the abnormal behavior is sensed.
(Supplementary Note 11)
An image processing device including:
person region detection means for detecting a person region that is a region where a person appears in an image captured by a camera device, and
privacy processing means for performing, on the person region, privacy processing a strength of which differs according to a depth associated with coordinates of the person region or a predetermined index related to the depth.
(Supplementary Note 12)
An image processing method including:
detecting a person region that is a region where a person appears in an image captured by a camera device, and
performing, on the person region, privacy processing a strength of which differs according to a depth associated with coordinates of the person region or a predetermined index related to the depth.
(Supplementary Note 13)
A program storage medium storing a program that causes a computer to execute:
a process of detecting a person region that is a region where a person appears in an image captured by a camera device, and
a process of performing, on the person region, privacy processing a strength of which differs according to a depth associated with coordinates of the person region or a predetermined index related to the depth.
This application claims priority to Japanese Patent Application No. 2016-058401 filed in Mar. 23, 2016, the entire contents of which are incorporated herein by reference.

INDUSTRIAL APPLICABILITY

The present invention may preferably applicable to applications for protecting individual privacy in any image with an image quality maintained as high as enabling viewers to figure out conditions.

REFERENCE SIGNS LIST 10 camera device
20 image processing device
21 image input unit
22 person region detection unit
23 depth information acquisition unit
24 privacy processing unit
25 image output unit
26 abnormal behavior sensing unit
27 face region detection unit
1000 computer
1001 CPU
1002 main storage device
1003 auxiliary storage device
1004 interface
1005 display device
600 camera device
700 image processing device
701 person region detection unit
702 privacy processing unit
703 depth information acquisition unit

The invention claimed is:
1. A monitoring system comprising:
one or more memories storing instructions; and
one or more processors configured to execute the instructions to:
detect a person region including a plurality of persons in an image captured by comparing a specific region in the image captured with a local image including a plurality of persons;
perform, on the person region, privacy processing a strength of which differs according to at least one of a depth associated with coordinates of the person region and a predetermined index related to the depth, wherein
the specific region set in lower region of the image captured is compared with larger local image, and the specific region set in upper region of the image captured is compared with smaller local image, the lower region being a region that is captured nearer to a camera device in a real space, the upper region being a region that is captured farther from the camera device in the real space.
2. The monitoring system according to claim 1, wherein the local image is smaller than the image captured and is an image including a set of reference sites of more than two persons constituting a crowd.
3. The monitoring system according to claim 1, wherein the local image an image including various number of sets of reference sites of more than two persons viewed from various angles.
4. A monitoring method comprising:
detecting a person region including a plurality of persons in an image captured by comparing a specific region in the image captured with a local image including a plurality of persons;
performing, on the person region, privacy processing a strength of which differs according to at least one of a depth associated with coordinates of the person region and a predetermined index related to the depth, wherein
the specific region set in lower region of the image captured is compared with larger local image, and the specific region set in upper region of the image captured is compared with smaller local image, the lower region being a region that is captured nearer to a camera device in a real space, the upper region being a region that is captured farther from the camera device in the real space.

5. The monitoring method according to claim 4, wherein the local image is smaller than the image captured and is an image including a set of reference sites of more than two persons constituting a crowd.

6. The monitoring method according to claim 4, wherein the local image an image including various number of sets of reference sites of more than two persons viewed from various angles.

7. A non-transitory computer readable storage medium storing a program that causes a computer to execute:
- a process of detecting a person region including a plurality of persons in an image captured by comparing a specific region in the image captured with a local image including a plurality of persons;
- a process of performing, on the person region, privacy processing a strength of which differs according to at least one of a depth associated with coordinates of the person region and a predetermined index related to the depth, wherein the specific region set in lower region of the image captured is compared with larger local image, and the specific region set in upper region of the image captured is compared with smaller local image, the lower region being a region that is captured nearer to a camera device in a real space, the upper region being a region that is captured farther from the camera device in the real space.

8. The storage medium according to claim 7, wherein the local image is smaller than the image captured and is an image including a set of reference sites of more than two persons constituting a crowd.

9. The storage medium according to claim 7, wherein the local image an image including various number of sets of reference sites of more than two persons viewed from various angles.

* * * * *